No. 12,113. REISSUED MAY 19, 1903.
J. D. PRICE.
RAILWAY SIGNAL.
APPLICATION FILED JULY 18, 1902.
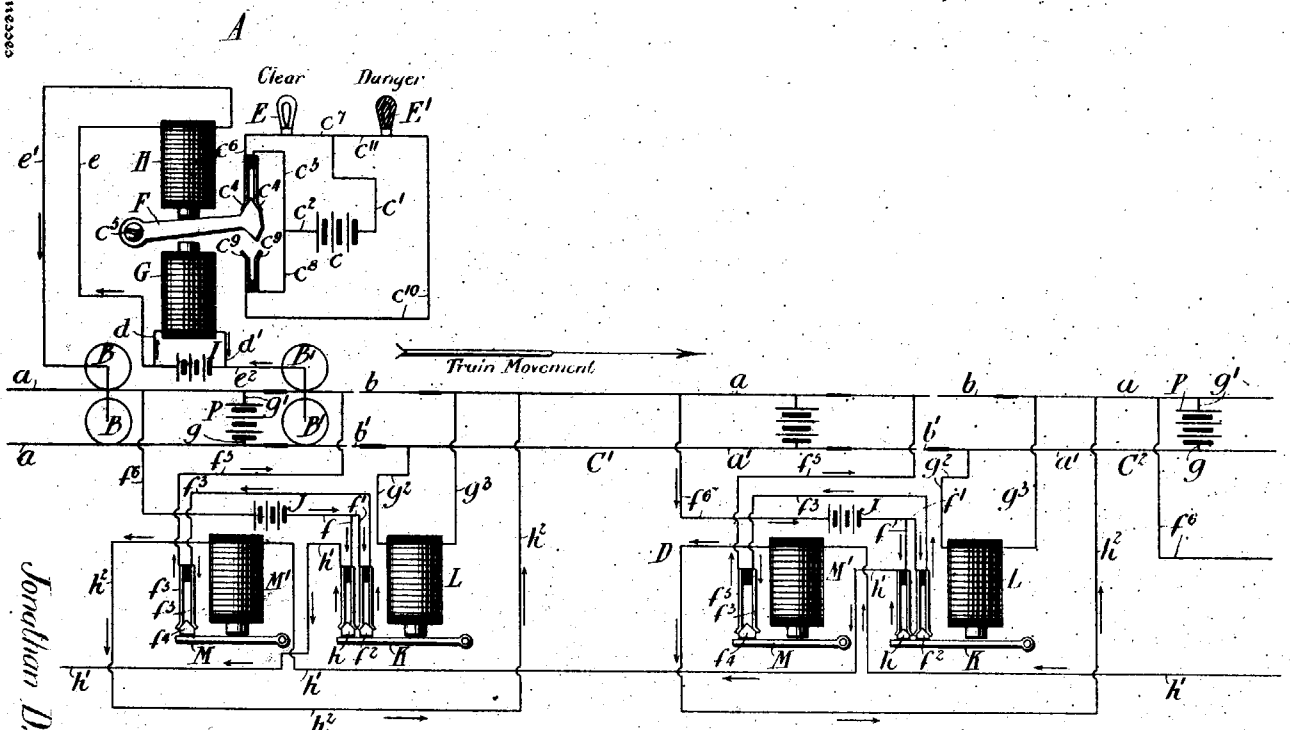
Witnesses
W. J. Norton
Inventor
Jonathan D. Price
By Dyrenforth Dyrenforth & Lee
his Attorneys No. 12,113.

Reissued May 19, 1903.

UNITED STATES PATENT OFFICE.

JONATHAN D. PRICE, OF AURORA, ILLINOIS, ASSIGNOR TO THE MILLER SIGNAL COMPANY, OF CHICAGO, ILLINOIS, A CORPORATION OF ILLINOIS.

RAILWAY-SIGNAL.

SPECIFICATION forming part of Reissued Letters Patent No. 12,113, dated May 19, 1903.

Original No. 672,626, dated April 23, 1901. Application for reissue filed July 18, 1902. Serial No. 116,136.

*To all whom it may concern:*

Be it known that I, JONATHAN D. PRICE, a citizen of the United States, residing at Aurora, in the county of Kane and State of Illinois, have invented a new and useful Improvement in Railway-Signals, of which the following is a specification.

My invention relates particularly to the block system of railway-signals in which the condition of any given block or section of the track is by suitable signs made known to an engineer (or other trainman) before the train enters thereupon. Heretofore in such systems the signals have been located in some instances at the side of the track and in some instances on the train, the operation being either automatic or manual, as desired. Many objections to locating the signal devices at the side of the track might be enumerated. Hence the desirability of a practical, cheap, and effective construction wherein the signal is located on the train. So far as I know it has prior to this invention been necessary in practice to use a third rail in these systems where the signal is located on the train.

The primary object of my invention is to provide an improved construction wherein the track-rails may be practically utilized as a part of the mechanism for operating signals located on the train, (preferably in the engine-cab,) thereby obviating the necessity of a third rail with its attendant disadvantages, and, as will appear, the invention is applicable to both the automatically and the manually operated systems.

The accompanying drawing represents diagrammatically one full block and portions of the two adjacent blocks of a railway-track, together with portions of an engine, (or car,) the engine being supposed to carry suitable signals and electric devices for operating the same, and the track being shown so constructed and equipped that the condition of any given block will be indicated by the signals in the cab. The drawing illustrates the invention in preferred form; but it will be understood readily that certain features of the construction may be omitted and that certain devices employed may be replaced by equivalent devices.

Generally stated, the invention comprises suitable portable or transient signals and actuating mechanism therefor located on the train, track-rails having insulated sections and local mechanisms for the several blocks novelly combined therewith and properly connected with the track-rail sections and serving to act upon or influence the transient mechanism to cause the latter to change the signals to indicate change in track conditions.

A description of the preferred construction follows.

The transient signals and operating mechanism therefor are located at A upon a train, being supported thereupon in any suitable manner. Wheels B and B′ are conventionally illustrated beneath said mechanism and supported by the tracks.

C, $C^1$, and $C^2$ represent the several blocks of track shown. The track-rails of each block comprise electrically separated or insulated sections $a$ and $b$ and $a'$ and $b'$, respectively, the sections $b$ and $b'$ being relatively short sections which mark the block divisions or boundaries.

D D represent local or non-transient mechanisms connecting the blocks and serving to actuate or influence the transient signal-operating mechanism.

At A are located a clear-signal E and a danger-signal E′, preferably electric lights, the former emitting white (clear) light and the latter red (danger) light. These lights are arranged in independent circuits, having, however, a common battery $c$ and common wires $c'$ and $c^2$. The circuit for light E is completed through wire $c^3$, contacts $c^4$ $c^4$, an armature F, pivoted to any suitable support on a horizontal pivot $c^5$, wire $c^6$, light E, and wire $c^7$. The circuit for light E′ is completed through wire $c^8$, contacts $c^9$ $c^9$, armature F, wire $c^{10}$, light E′, and wire $c^{11}$. The armature F swings in a vertical plane between magnets G and H, the former being below and the latter above the armature, whereby the force of gravity acts to assist the one and oppose the other. A battery I constantly energizes the magnet G through conductors $d$ and $d'$, the current passing in the direction indicated. From one pole of battery I a conductor $e$ passes to magnet H and from magnet H a conductor $e'$ passes to the axle of wheels B. To the other pole of said battery a conductor $e^2$ leads from the axle of wheels B'. Where the track is electrically continuous, the circuit for magnet H is completed through a rail or rails, and the magnet is then sufficiently powerful to hold the armature F after the latter has been brought close into its field through the action of a reinforcing-battery located at the block-boundary. After a block-junction has been crossed the armature F remains in either its elevated or depressed position, according to the nature of the last signal, till the next block-junction is reached, when it will change position if the track condition has been changed in the meantime.

From the immediately-preceding description it will be seen that gravity and the magnet G act together constantly to hold the armature F depressed, thereby tending to keep the danger-light circuit closed and the clear-light circuit broken. This action is successfully resisted by the magnet H till a point of insulation in the track is reached, when the armature F will fall unless a relatively long circuit for H is immediately established through the local partial circuit. As will readily appear from the description which follows, where the wheels B and B' are chosen as conductors leading from the track to the signal-operating mechanism and back it practically is necessary that they be insulated from each other, except through said mechanism, and this is done in any suitable manner, so far as the train itself is concerned.

At each point D, I locate a relatively strong reinforcing-battery J, which, together with its connections, acts at proper times to complete the interrupted short circuit of the upper magnet H of the transient mechanism. Each battery J and its connections afford one form of a local partial circuit which is normally closed and terminates at the track. Should this local partial circuit be interrupted, a relatively long circuit for magnet H cannot be established, and armature F will drop. Should the partial circuit be uninterrupted and the armature F depressed, as by an interruption at the preceding block, the reinforcing-battery will send such current through the temporary long circuit as to bring the armature again to the magnet H, where it will remain till an interrupted local partial circuit is again encountered. As shown, the course of the current for the rear battery J is from said battery through conductors $f f'$ to contact $f^4$ on an armature K of a relay-magnet L, controlled from the block in advance of the train, (here C',) thence through conductors $f^3$ to contact $f^4$ on armature M of a magnet M', controlled from the second advance block, (here C²,) and thence through a conductor $f^5$ to rail-section $b$. From section $b$ current passes through wheels B', conductor $e^2$, battery I, conductor $e$, field-winding of magnet H, conductor $e'$, wheels B, and, finally, conductor $f^6$, leading from rail-section $a$ back to battery J. The current of battery J acts, as indicated, with the current of battery I so far as the the field of magnet H is concerned and against the same so far as the field of magnet G is concerned. Each battery J is similarly connected.

Each block is provided with a track-battery P, connected with the advance ends of the rail-sections $a$ and $a'$ by conductors $g$ and $g'$. Conductors $g^2$ $g^3$ connect the rear ends of the same rail-sections with the corresponding relay-magnet L.

It will now be understood that if a train is in block C' the current normally passing from the track-battery P of said block will be short-circuited, allowing the armature of the relay-magnet L to fall, thereby interrupting the stationary or non-transient portion of the circuit of the reinforcing-battery J. If at such time the train mechanism described of the train following the train for the moment supposed to be in section C' reaches the position shown in the diagram, whereby the rail completion of the short circuit of the magnet H is interrupted, the armature F will drop and complete the danger-signal circuit, at the same time interrupting the clear-signal circuit. When there is no train in block C', the relay-magnet remains closed and there is no interruption at $f^2$. Hence the batteries I and J will act together through the temporarily-established long circuit of the magnet H.

It will be observed that the insulations occurring to the right of sections $b$ and $b'$ of any given block are not directly opposite each other. The purpose of staggering or mismatching the insulations at the advance ends of said rails is to preserve one rail conductor for completing the short circuit of the magnet H, whereby the latter is kept energized while the wheels B and B' are leaving the sections $b$ and $b'$. The interruption to this short circuit occurs at each block while the front set of wheels employed are on the sections $b$ and $b'$ and the rear set of wheels are on the sections $a$ and $a'$. If the long circuit is immediately established as the wheels B' pass onto the sections $b$ and $b'$, there is no drop of the armature F; but if there is an interruption of the long circuit, as by the short-circuiting of the current passing to the relay-magnet, the danger-signal will be given. The insulations to the right of sections $b$ and $b'$ must of course be so placed that current can pass from the rear set of wheels to the front set of wheels through the track at all times after the rear wheels have passed onto said sections. In the drawing I have shown the sections $b$ and $b'$ broken to indicate that they are of greater length than their apparent length.

It will be observed that the rear magnet M' (for instance) takes no part in interrupting the circuit of battery J of the corresponding block-junction so far as the immediate advance-block C′ is concerned. The purpose of sending the current of battery J through contact $f^4$ of armature M, however, is to enable the interruption to proceed from the second advance-block $C^2$ where so desired. In carrying out this purpose a second circuit for battery J of a given block is provided through conductor $f$, a second contact $h$ on relay-armature K, conductor $h'$ to magnet M′ of succeeding block, conductor $h^2$ to rail-section $a$ of the given block, and thence back to conductor $f^6$, connected with the battery. Suppose now a train to be on block $C^2$. The relay-magnet L of the mechanism located at the junction of blocks C′ and $C^2$ will be deenergized and the corresponding armature K will fall, thereby breaking at contact $h$ the secondary circuit of the battery J, located at the junction of blocks C and C′, thus deënergizing magnet M′ and breaking at contact $f^4$ the long circuit of signal-magnet H. Thus by a simple expedient the train is caused to signal back to the second block in the rear, whereby the engineer of the following train is enabled to leisurely bring his train to slow motion or stop without violent shock or waste of energy.

The magnet L and armature K may be replaced by a manually-operated switch, if desired, in which case the magnet M′ and related parts can be dispensed with. Where the signal is given automatically, it is desirable to have a source of electric energy connected with the rail-sections of the block near their advance ends and to provide the train with properly-insulated track-engaging conductors for taking a current from the track and conveying it to a device for acting upon or affecting the signals.

In its simplest form for a manual system (referring particularly to the train-carried mechanism) the invention comprises signals and electric devices for controlling the same mounted on the train in the manner shown, conductors leading from said electric devices to the track, insulated track-rail sections, and switch-connected conductors connected therewith. This characterization is met by the mechanism with the battery P omitted, the automatically-operated switch being replaced by a manually-operated switch.

In more specific form for a manual system (referring particularly to the track equipment) the invention comprises signals and electromagnetic devices controlling the same mounted on the train, conductors leading from said electromagnetic devices to the track, insulated track-rail sections, block-junction generators connected with rail-sections in substantially the manner shown to form local partial circuits with normally energized track-rail sections lying one in advance of the other, and normally closed circuit-altering devices in said local partial circuits and through which said rail-sections are normally energized. This characterization is met by the mechanism with the battery P omitted, the automatically-operated switch being replaced by a manually-operated switch.

In more specific form for the automatic system the invention comprises relay-magnets connected with both track-rails of the several blocks and controlling circuit-changers in local partial circuits, which include adjacent rail-sections which are normally maintained in a charged condition under clear-track conditions, track-generators connected with both track-rails of the several blocks and normally energizing said magnets under clear-track conditions, and safety and danger signals carried by the train.

It should not be inferred from the foregoing statements that it is actually necessary to break the local partial circuit in order to give the danger signal, but only that it is necessary to alter such circuit in any suitable manner. Any suitable signals may be employed, and the electric or electromagnetic signal-controlling device may be changed at will; and the improved track equipment may be employed in connection with any suitable coöperative train-carried mechanism of whatever character.

It is not essential to my invention that ordinary supporting-wheels of the engine or car be used as conductors for conveying the current from the track. Such wheels may be conveniently employed, however, by insulating one set from another, and this may be readily accomplished by insulating a locomotive from its tender, when the tender becomes one track-engaging conductor and the engine the other one.

It is noteworthy that the magnet H when the train mechanism is in the position indicated may be deënergized or sufficiently weakened to cause it to release the armature F by other suitable means for interrupting or changing the current from battery J or for altering the local partial circuit than the circuit-breaking device employed. A common expedient in apparatus of the same general character is to reverse the direction of current or to neutralize the current instead of breaking its circuit. Such an expedient is deemed within the spirit of my invention and within the scope of the appended claims.

The term "circuit-altering device" where employed in the claims should be understood, in order to give full effect to the invention, to include circuit-breakers, pole-changers, and all devices serving to interrupt, alter, or reverse the current of the local partial circuit.

What I claim as new, and desire to secure by Letters Patent, is—

1. The combination of a track having insulated track-rail sections, a local source of electric energy, conductors connecting said source with two of said sections and forming therewith a local partial circuit, signals mounted to be carried above said track, a circuit-altering device for the local partial circuit, a transient signal-controlling electric device, a transient source of electric energy, and suitably-insulated conductors connected with said transient electric source and controlling device and simultaneously engaging said two track-rail sections of said local partial circuit, whereby said local partial circuit is completed through said controlling device, substantially as described.

2. The combination of a track having insulated track-rail sections, a local source of electric energy, local conductors connecting said source with two of said track-rail sections, means for making and breaking the partial circuit thus formed, transient signals for the train, electric controlling devices therefor, a transient electric source, and conductors carried by the train and arranged to receive the current from one rail-section of said local partial circuit and convey the same through said signal-controlling device to the other rail-section of said local partial circuit, substantially as and for the purpose set forth.

3. The combination of a track divided into blocks and having insulated track-rail sections, a local source of energy connected with two insulated sections near a division between blocks, one of said last-named sections being in advance of the other, a circuit maker and breaker for the partial circuit thus formed, a source of electric energy connected with both track-rails near the advance end of the advance block, and automatic means connected with the last-named block and with said circuit-maker for closing the same when said block is clear and opening the same when the block is obstructed, substantially as and for the purpose set forth.

4. The combination of insulated track-rail sections, a battery connected with two sections located one in advance of the other, a relay-magnet for making and breaking the partial circuit thus formed, a track-battery connected with both track-rails, and conductors connecting said track-rails with said relay-magnet, substantially and for the purpose set forth.

5. The combination of insulated track-rail sections, a battery connected with two adjacent sections, a relay-magnet for making and breaking the partial circuit thus formed, a track-battery connected with both track-rails near the advance end of a block, conductors connecting said track-rails near the rear end of the block with said relay-magnet, transient signals mounted to be carried above said track, an electric controlling device carried therewith, and track-engaging conductors connected with said controlling device, substantially as and for the purpose set forth.

6. The combination of a track divided into blocks and having insulated track-rail sections, sources of electric energy connected with the rails at the advance ends of the blocks, local signal-controlling electric supply sources connected with the respectively adjacent blocks at the junctions thereof, relay-magnets supplied with circuit-breakers and controlling the circuits of said last-named sources and connected each to an immediate advance block, extra circuit-breakers carried by the armatures of said relay-magnets, auxiliary magnets provided with circuit-breakers in the circuits of said local signal-controlling sources, and circuit connections between the auxiliary magnet of each block and the relay-armature of an advance block, whereby, when a train occupies a given block, the auxiliary magnet of a remote succeeding block is de-energized and the local signal-controlling circuit broken, substantially as and for the purpose set forth.

7. The combination of a track divided into blocks having insulated track-rail sections, clear and danger signals mounted upon a car traversing said track, electrically-actuated mechanism controlling said signals, conductors therefor engaging the track, track-batteries connected with the advance ends of both rails of the plurality of blocks, and electric devices connecting the junction between two given blocks with a block in advance of the two given blocks and including a track-connected signal-controlling battery and a switch-controlling magnet, whereby the condition of a block in front of the one on which the train is about to enter may be indicated, substantially as and for the purpose set forth.

8. The combination of electric clear and danger signals mounted upon a train, circuits therefor having adjacent contacts, a transient electric source, an upper and a lower magnet, an oscillating armature between said magnets and serving to close either of said circuits, conductors leading from the upper magnet to the track, a track divided into insulated blocks, and local means for the several blocks for supplying when not interrupted an electric current to said conductors through the medium of the track, substantially as and for the purpose set forth.

9. The combination of a track divided into blocks, each having a track-rail electrically divided into sections *a* and *b*, local conductors joining section *a* of one block to section *b* of another block, a source of electric energy in the course of said conductors, means for breaking the partial circuit thus formed, signals mounted on a train, electric controlling device therefor, and conductors leading from controlling device to track and located to simultaneously engage the sections *a* and *b*, substantially as and for the purpose set forth.

10. The combination of transient signal-lights E and E′, circuits therefor, vertically-swinging armature F, upper and lower controlling-magnets therefor, battery I, conductors leading therefrom to magnet G, conductors leading from said battery to the track, one of which includes the field-winding of magnet H, insulated track-sections, and a local device for supplying (when not interrupted) current to said conductors while the train is passing from block to block, when the track is clear, substantially as and for the purpose set forth.

11. The combination of a track divided into blocks having insulated rail-sections, local batteries J, primary partial circuits therefor connected with rail-sections, magnets L and M′ controlling said partial circuits, secondary circuits connecting magnet M′ of each block with the battery J and armature of magnet L of an advance block, track-batteries connected with the advance ends of the several blocks, and conductors connecting magnets L to said blocks, substantially as and for the purpose set forth.

12. The combination of insulated track-rail sections, a battery connected with two of said sections of different blocks, a magnet for making and breaking the partial circuit thus formed and normally energized to hold the partial circuit closed, and conductors leading from said magnet and through which the magnet is energized and deënergized, substantially as and for the purpose set forth.

13. The combination of insulated track-rail sections, electric clear and danger signals mounted upon a train traversing the track, circuits for said electric signals, an armature for breaking either circuit and closing the other circuit, a magnet for holding said armature in position to close the clear-signal circuit, and conductors leading from said magnet and located to engage two of said track-rail sections, whereby when the circuit for said magnet, established through a rail or rails, is interrupted by a point of insulation, said magnet is deënergized, the clear-signal circuit broken, and the danger-signal circuit closed, substantially as and for the purpose set forth.

14. The combination of a clear or safety transient signal, electric controlling mechanism therefor, a transient electric generator in circuit with said controlling mechanism, conductors leading to the track and arranged one in advance of the other and through which a closed relatively short circuit is maintained, except at block-junctions, insulated track-rail sections at the block-junctions, conductors connected with the track-rails, and a local electric generator forming with said last-named conductors a local normally closed partial circuit terminating at the rails and through which, assuming said partial circuit to remain uninterrupted, a relatively long circuit for said controlling mechanism is established when one of said track-engaging conductors crosses a point of insulation at a block-junction and interrupts said short circuit, substantially as and for the purpose set forth.

15. The combination of a track having insulated track-rail sections, a local source of electric energy, conductors connected with two of said sections and forming therewith a local partial circuit, means for interrupting, when desired, the current of said local source of energy to prevent it from acting either to maintain or reset the safety-signal when the train mechanism is in position to receive said current, and train mechanism comprising signals mounted to be carried above said track, a transient signal-controlling electric device, a transient source of electric energy, and suitably-insulated conductors connected with said transient electric source and controlling device and simultaneously engaging said two track-rail sections of said local partial circuit, whereby said local partial circuit is completed through said signal-controlling device, substantially as described.

16. The combination of a track divided into blocks and having insulated track-rail sections, a local source of energy connected with two insulated sections near a division between two of the blocks and forming therewith a local partial circuit, one of said last-named sections being in advance of the other, means connected with the advance block for interrupting the current of said local source of energy, at desired times, to prevent it from acting either to maintain or reset the safety-signal, a source of electric energy connected with both track-rails near the advance end of the advance block and serving when not interrupted to maintain the normal condition of said local partial circuit, and train-carried signal mechanism comprising clear and danger signals, an electric controlling device therefor, and conductors for the controlling device carried by the train and simultaneously engaging the rail-sections of said local partial circuit, whereby the circuit is completed through the local partial circuit at block-junctions when the track is clear, substantially as and for the purpose set forth.

17. The combination of a track divided into blocks having insulated rail-sections, local batteries J, primary partial circuits therefor connected with rail-sections, magnets L and M′ controlling said partial circuits, secondary circuits connecting magnet M′ of each block with the battery J and armature of magnet L of an advance block, track-batteries connected with the advance ends of the several blocks, conductors connecting magnets L to said blocks near their rear ends, and train mechanism comprising clear and danger signals, an electric controlling device therefor, and conductors leading from said controlling device to the track and simultaneously engaging the rail-sections of a local partial circuit at the block-junction, whereby the current is conducted from the battery J at said junction to said controlling device when the track is clear, substantially as and for the purpose set forth.

18. The combination of insulated track-rail sections, a battery connected with two of said sections of different blocks, a magnet for making and breaking the partial circuit thus formed and normally energized to hold the partial circuit closed, conductors leading from said magnet and through which the magnet is energized and deënergized, and train mechanism comprising clear and danger signals, an electric controlling device therefor, and conductors leading from said controlling device and simultaneously engaging said rail-sections of said different blocks, whereby a circuit is established for said local battery through said electric controlling device at the block-junction, substantially as and for the purpose set forth.

19. The combination of a track divided into blocks and having insulated track-rail sections, a local source of energy connected with two insulated rail-sections near a block-junction, one of said last-named sections being in advance of the other, a circuit-altering device for the partial circuit thus formed operating to maintain said partial circuit normally closed and said two rail-sections normally charged under clear-track conditions, and automatic means connected with both track-rails in advance of said block-junction and controlling said circuit-changer, for the purpose set forth.

20. The combination of a track divided into blocks and having insulated track-rail sections, a local source of energy connected with two insulated rail-sections near a block-junction, one of said last-named sections being in advance of the other, a circuit-altering device for the partial circuit thus formed operating to maintain said partial circuit normally closed and said two rail-sections normally charged under clear-track conditions, automatic means connected with both track-rails in advance of said block-junction and controlling said circuit-changer, and train-carried electromagnetic mechanism having conductors engaging said track, one in advance of the other, for the general purpose set forth.

21. The combination of insulated track-rail sections, a generator connected with two rail-sections located one in advance of the other, a circuit-altering device for the local partial circuit thus formed normally closed to maintain said two rail-sections in an energized condition, a relay-magnet controlling said circuit-changer and connected with both track-rails of a given block, and a track-generator connected with both track-rails of said block, for the purpose set forth.

22. The combination of a track having its track-rails divided into blocks with a relatively short rail-section for each track-rail at each block-junction, a local generator connected with a short rail-section and another rail-section to form therewith a local partial circuit, one of said last-named sections being in advance of the other, a relay-magnet serving as a circuit-altering device for said partial circuit and normally maintaining said partial circuit closed and the rail-sections thereof in a charged condition under clear-track conditions, a track-battery connected with both track-rails of a block and automatically controlling said relay-magnet, transient clear and danger signals mounted to be carried above said track, an electric controlling device carried therewith and serving normally to maintain a clear signal unless said track-battery current is interrupted, and track-engaging conductors arranged to engage the track one in advance of the other, and serving to complete a temporary circuit for said local generator at the block-junction, for the purpose set forth.

23. The combination of insulated track-rail sections, a local generator connected with two of said sections located one in advance of the other and forming therewith a local partial circuit, a magnet connected with both track-rails of a block and having a circuit-altering device for said local partial circuit which is normally closed under safety conditions to maintain the two rail-sections of said local partial circuit in a charged condition, and a track-generator connected with both track-rails of said last-named block, for the general purpose set forth.

24. The herein-described improved engine equipment adapted to traverse a track having blocks with insulated track-rail sections, comprising electric clear and danger signals mounted upon a train traversing the track, circuits for said electric signals, a transient electric source, an armature for breaking either circuit and closing the other circuit, a magnet for holding said armature in position to close the clear-signal circuit, and conductors leading from said magnet and located to engage two of said track-rail sections, whereby when the circuit for said magnet, established through a rail or rails, is interrupted by a point of insulation, said magnet may be deënergized, the clear-signal circuit broken, and the danger-signal circuit closed, substantially as and for the purpose set forth.

JONATHAN D. PRICE.

In presence of—
JNO. M. RITTER,
A. C. MILLER.